United States Patent [19]

Ohkubo

[11] Patent Number: 5,122,104
[45] Date of Patent: Jun. 16, 1992

[54] AUTOMATIC TRANSMISSION

[75] Inventor: Masahiro Ohkubo, Osaka, Japan

[73] Assignee: Kabushiki Kaisha Daikin Seisakusho, Osaka, Japan

[21] Appl. No.: 727,368

[22] Filed: Jul. 9, 1991

Related U.S. Application Data

[63] Continuation of Ser. No. 587,471, Sep. 21, 1990, abandoned, which is a continuation of Ser. No. 826,039, Feb. 4, 1986, abandoned.

[30] Foreign Application Priority Data

Feb. 12, 1985 [JP] Japan ................. 60-25906

[51] Int. Cl.⁵ ............................... F16H 47/08
[52] U.S. Cl. ..................... 475/291; 475/61; 475/138
[58] Field of Search .......... 475/59, 61, 64, 138, 475/282, 283, 290, 291; 192/3.23, 3.24

[56] References Cited

U.S. PATENT DOCUMENTS

| | | | |
|---|---|---|---|
| 3,272,032 | 9/1966 | Smalinskas | 74/677 |
| 3,313,179 | 4/1967 | Flinn | 74/677 |
| 3,359,827 | 12/1967 | Chapman, Jr. et al. | 74/677 |
| 3,398,604 | 8/1968 | Hause | 74/769 |
| 3,435,707 | 4/1969 | De Julian | 74/688 X |
| 3,528,321 | 9/1970 | Harmon et al. | 74/677 |
| 3,557,635 | 1/1971 | Tuck | 74/677 |

FOREIGN PATENT DOCUMENTS

2627844 1/1977 Fed. Rep. of Germany ........ 74/688
52-3975 1/1977 Japan ............................ 74/677

Primary Examiner—Richard Lorence
Assistant Examiner—William O. Trousdell
Attorney, Agent, or Firm—Armstrong & Kubovcik

[57] ABSTRACT

An automatic transmission having a turbine, a pump, a first stator and a second stator and a speed changer having a planetary gear train composed of first and second planetary gears sharing one planetary carrier in common and a clutch or brake for controlling the planetary gear train. The turbine of the torque converter is coupled to a turbine shaft which transmits power from the turbine to the speed changer. A first stator is provided at a turbine side between the turbine and the pump, the first stator being coupled to a first stator shaft for transmitting power from the first stator to the speed changer a one-way clutch. A second stator is provided at a pump side between the turbine and the pump. The second stator is connected to a housing though a second stator shaft having a one-way clutch for transmitting power in a direction reverse to the rotation direction of the pump. A clutch or brake for controlling rotation speed of the first stator shaft is provided in the course of the first stator shaft. A first sun gear meshing with the first planetary gear of the speed changer is fixed to an end portion of the turbine shaft. A second sun gear meshing with the second planetary gear of the speed changer is fixed to an end portion of the first stator shaft. A brake is provided at a clutch cover side of the clutch.

2 Claims, 5 Drawing Sheets

FIG.5

AUTOMATIC TRANSMISSION

This application is a continuation of application Ser. No. 587,471 filed Sep. 21, 1990, now abandoned which in turn is a continuation of application Ser. No. 826,039, filed Feb. 4, 1986, now abandoned.

BACKGROUND OF THE INVENTION

1. Industrial Useful Field

This invention relates to an improvement of an automatic transmission and especially to an automatic transmission which is designed to improve a power transmission efficiency at each speed ratio zone.

2. Prior Art and Its Problem

First in case of a passenger car, corresponding to a manual four-speed speed changer a three-speed automatic transmission is used, which combines a three-element, one-stage type torque converter and a three-speed speed changer having a planetary gear train.

This three-speed speed changer has two pairs of planetary gear trains, two clutches and two brakes, and is so adapted as to change speed in forward three speeds and backward one speed by automatically controlling the clutches and brakes.

Incidentally, in a conventional automatic transmission, transmission characteristics of torque converter are transmitted to a rear-stage speed changer at a constant condition over the entire speed ratio, and are similarly changed speed by the speed changer.

Further, as has been known, the torque converter has such a characteristic that a turbine torque larger than a pump torque (large torque ratio) is outputted as a turbine rotation speed becomes smaller than a pump rotation speed (low speed ratio).

On the other hand, since a vehicle requires a largest torque when being accelerated, the above-mentioned torque converter characteristic will function effectively in a low speed ratio zone but a driving power will become insufficient in a frequently-used intermediate speed ratio zone and further in a high speed ratio zone.

Therefore, in a conventional automatic transmission, its torque converter is so designed that characteristics of torque converter may develope a good torque and excellent efficiency in the intermediate speed ratio zone.

In such a torque converter, however, it is inevitable to minimize a torque generated in the low speed ratio zone due to the above-mentioned reason, and a stall torque ratio is generally about 2 so that a sufficient torque output can not be obtained at the time of accelerating the vehicle.

For this reason, the vehicle speed is changed into three steps using a speed changer. However, since the speed changer is equipped with two clutches and two brakes for carrying out an automatic control, its mechanism becomes complicated to require a troublesome control.

Next in case of an automatic transmission for use in truck, a tractive force larger than that of passenger car is required so that a four-speed automatic transmission is used, which combines a three-element, one-stage torque converter and a four-speed speed changer having a large reduction ratio corresponding to a six-speed of manual speed changer.

In this speed changer, since it is necessary to automatically control three pairs of planetary gear train by the use of two clutches and three brakes, the automatic transmission becomes more complicated than the case of passenger car.

Further in case of an automatic transmission for use in a construction machine, a torque converter having a large stall torque is combined with a three-speed or four-speed power shift speed changer in order to further increase a tractive force. However, this type of tranmission includes a problem of worse fuel consumption due to an insufficiency in torque in the intermediate speed ratio zone and a deterioration of efficiency.

OBJECT OF THE INVENTION

An object of the present invention is to provide an automatic transmission which can develop a similar tractive force characteristic and a construction of which can be simplified by changing characteristics of torque converter in every speed ratio zone, even if a stage number of changing speed is decreased as compared with a conventional one.

COMPOSITION OF THE INVENTION (1) Technical measure

In an automatic transmission combining a four-element, two-stage type torque converter having a turbine, a pump, a first stator and a second stator with a speed changer having a planetary gear train composed of first and second planetary gears sharing one planetary carrier in common and a clutch or brake for controlling the planetary gear train; the turbine of the torque converter is coupled to a turbine shaft which transmits a power from the turbine to the speed changer; a first stator is provided at a turbine side between the turbine and the pump, the first stator being coupled to a first stator shaft, which transmits a power from the first stator to the speed changer, through a one-way clutch which transmits a power only in a direction reverse to a rotation direction of said pump; a second stator is provided at a pump side between the turbine and the pump, the second stator being connected to a housing through a second stator shaft having a one-way clutch which transmits a power only in a direction reverse to the rotation direction of said pump; a clutch or brakes for controlling a rotation speed of the first stator shaft is provided in the course of the first stator shaft; a first sun gear meshing with the first planetary gear of said speed changer is fixed to an end portion of the turbine shaft; a second sun gear meshing with the second planetary gear of said speed changer is fixed to an end portion of the first stator shaft; a brake is provided at a clutch cover side of said clutch; thereby a transmission efficiency of torque converter at each speed ratio zone is improved by making these brake and clutch selectively operate depending on a speed ratio.

(2) Function

The characteristics of torque converter in every speed ratio zone and a reduction ratio of the speed changer are changed by switching a transmission route of a power from the first stator through means of selective operation of clutch or brake.

DETAILED DESCRIPTION OF THE INVENTION

Embodiment (1) First embodiment

Figure 1:
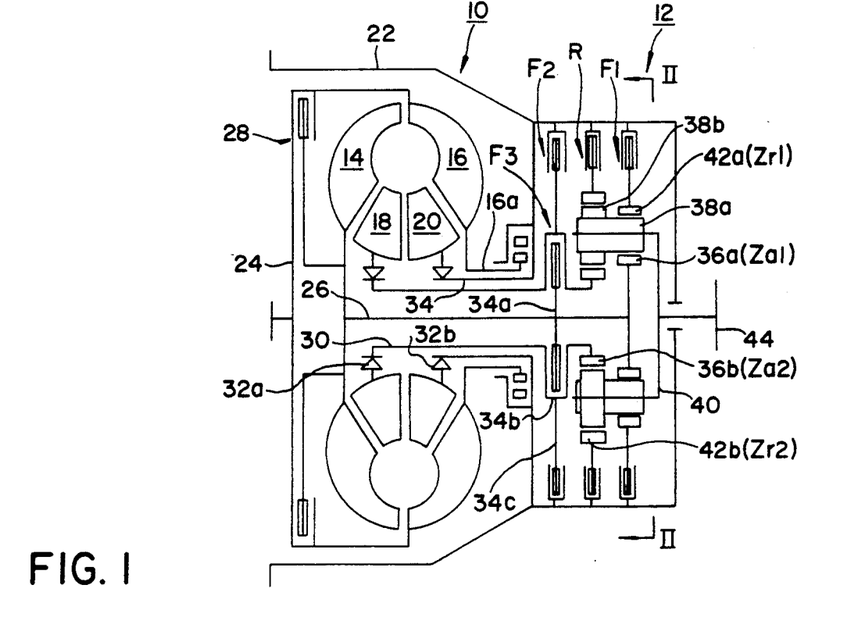
FIG. 1 is a schematic structural view according to the present invention showing an automatic transmission for use in a truck.

An automatic transmission for truck according to the present invention is shown in FIG. 1 as a typical embodiment. In FIG. 1, 10 is a four-element, two-stage type torque converter, and a forward three-speed, backward one-speed speed changer 12 is combined to a rear stage of the torque converter 10. The speed changer 12 has a planetary gear train composed of a first planetary gear and a second planetary gear sharing one planetary carrier in common and a clutch or brakes for controlling the planetary gear train. This speed changer 12 and the torque converter 10 form the automatic transmission.

The torque converter 10 consists of a turbine 14, a pump 16, a first stator 18, a second stator 20 etc., and is covered with a housing 22. The pump 16 is coupled to a flywheel 24 of an engine so that a power from the flywheel 24 is transmitted to the pump 14.

The turbine 14 is coupled to a turbine shaft 26, and a lock-up clutch 28 is installed between the turbine 14 and the flywheel 24.

The first stator 18 is installed at a turbine side between the turbine 14 and the pump 16, the first stator 18 being reversibly supported by bearing.

The first stator 18 is interconnected to a first stator shaft 30, and a one-way clutch 32a is interposed between the first stator and the first stator shaft 30. The one-way clutch 32a is so designed that it transmits a power to the first stator shaft 30 when the first stator revolves in the reverse direction to the turbine 14 and it runs idle when the first stator 18 revolves in the normal direction.

The second stator 20 is disposed at a pump side between the turbine 14 and the pump 16, the second stator being interconnected to the housing 22 through a second stator shaft 34 equipped with a one-way clutch 32b. The one-way clutch 32b also couples the second stator 20 to the second stator shaft 34 only when the second stator 20 revolves reversely.

The pump 16 is coupled to a pump shaft 16a, the pump shaft 16a being rotatably supported through a bearing by the housing 22.

A clutch F3 comprising a clutch disc 34a and a clutch cover 34b is installed at an intermediate portion between the turbine shaft 26 and the first stator shaft 30. The clutch disc 34a is fixed to the turbine shaft 26, and the clutch cover 34b is formed integrally with the first stator shaft 30.

A disc 34c is integrally fixed to a radially outward section of the clutch cover 34b, and a brake F2 is provided at an outer peripheral part of the disc 34c.

Switching between operation and non-operation, i.e. between locking and releasing of these clutch F3 and brake F2 can be effected at the time when a rotation speed of an output shaft 44 gets to a previously specified value on the basis of the rotation speed, for example, which can be detected easily by a well-known means.

Figure 2:
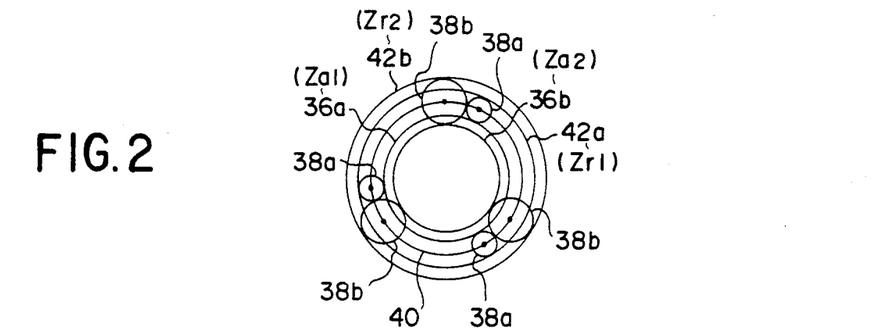
FIG. 2 is a sectional view taken on a line II—II of FIG. 1.

A first sun gear 36a is coupled to a speed changer side end of the turbine shaft 26, and a tooth number of the first sun gear 36a is settled as Za1. A first planetary gear 38a meshes with an outer periphery of the first sun gear 36a. The first planetary gears 38a are disposed at circumferential three places with equal distances provided therebetween as shown in FIG. 2.

Second planetary gears 38b meshing with the first planetary gears 38a are disposed at three places similar to the first planetary gears 38a on the outer periphery of the first sun gear 38a. The both planetary gears 38a and 38b are rotatably held by a planetary carrier 40.

The second planetary gear 38b meshes with the second sun gear 36b fixed to the speed changer side end of the first stator shaft 26, as shown in FIG. 1. A tooth number of the second sun gear 36b is Za2.

A first ring gear 42a (tooth number: Zr1) meshes with an outer periphery of the first planetary gear 38a, and a second ring gear 42b (tooth number: Zr2) meshes with an outer periphery of the second planetary gear 38b. Further, a brake F1 is provided at a radially outer periphery of the first ring gear 42a, the brake F1 being fixed to the housing 22. A brake R is provided at the outer periphery of the second planetary gear 38b, the brake R being fixed to the housing 22.

Said planetary carrier 40 is rotatably supported through a bearing by the housing 22 and is coupled to the output shaft 44.

Figure 1A:
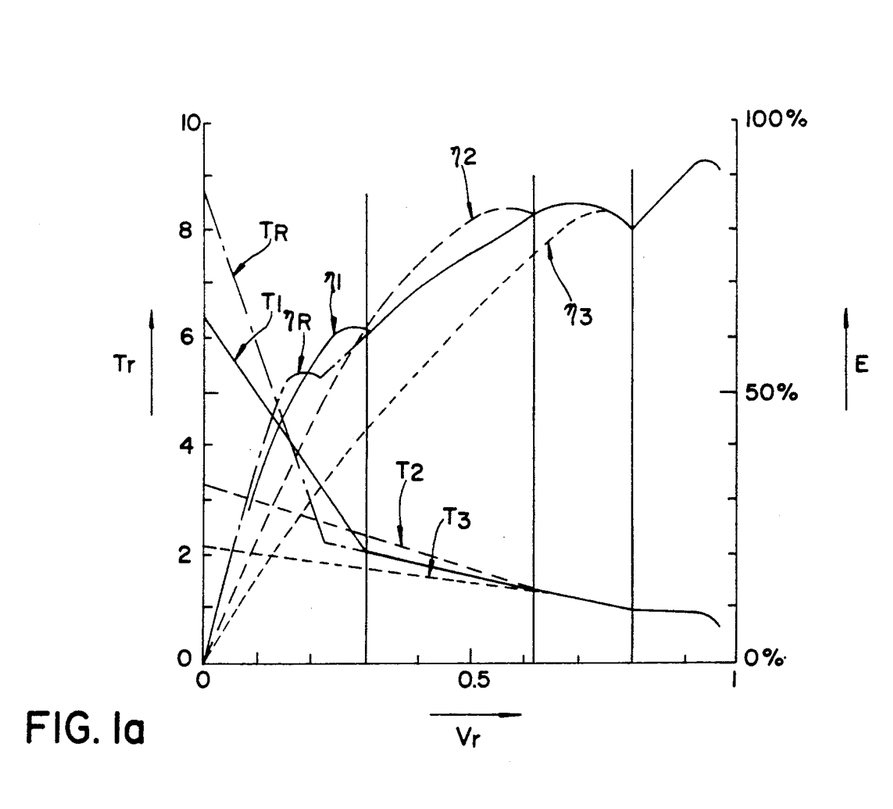
FIG. 1a is a graph showing a torque converter performance for FIG. 1.

Function will be described hereunder. First in the first-speed mode, only the brake F1 is switched to ON (fixed) and the other brakes and clutch are switched to OFF (released). In this first-speed mode, only the first ring gear 42a is fixed to the housing 22 and the other planetary gear trains mesh integrally each other to be rotated. Consequently, in a low-speed zone controlled by the first-speed mode, the first stator 18 acts as a reversing turbine, and a power of the torque converter 10 is transmitted to the speed changer 12 through both the turbine shaft 26 and the first stator shaft 30, the power being compounded by the both planetary gears 38a and 38b to be outputted from the planetary carrier 44. Therefore, as shown in FIG. 1a presenting behaviors of torque ratio Tr and efficiency E in relation to speed ratio Vr, an efficiency characteristic of the torque converter 10 in the first-speed mode shows a high efficiency in the low-speed ratio zone as seen from a characteristic η1 (solid line), and a torque ratio characteristic T1 (solid line) also shows a high torque ratio. Incidentally, a reduction ratio of the first-speed in a practical speed changer is about 3.

Figure 1B:
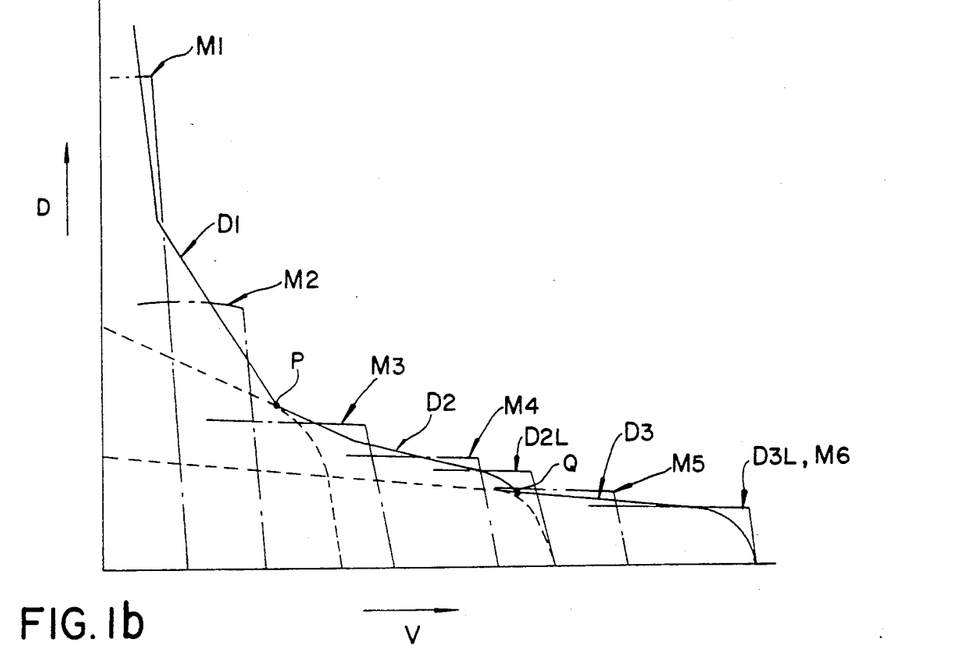
FIG. 1b is a graph showing a tractive force characteristic for FIG. 1.

Soon after the speed ratio rises, and the speed mode is switched to the second-speed mode by said automatic control at the time when a tractive force characteristic reaches a point P of FIG. 1b showing a behavior of traction force D in retation to vehicle speed V.

Under the second-speed mode, only the brake F2 is switched to ON and the other brakes and clutch are switched to OFF so that only the first stator shaft 26 and the second sun gear 36b are fixed to the housing 22. Under this state, the first stator 18 stands still similarly to the second stator 20, and reaction forces of the both stators 18 and 20 are superposed upon the turbine 14 through working oil to be transmitted from the turbine shaft 26 to the first sun gear 36a. Accordingly, the performance of torque converter developes characteristics $\eta 2$ and T2 showing high efficiency and high torque ratio in the intermediate speed ratio zone as shown in FIG. 1a. Further, a practical reduction ratio of the speed changer 12 becomes about 1.5.

When the speed ratio further rises and the tractive force characteristic reaches a point Q of FIG. 1b, the speed mode is switched to the third-speed mode by the automatic control.

Under the third-speed mode, only the clutch F3 is switched to ON so that the turbine shaft 26 rotates in the normal direction integrally with the first stator shaft 30. In this instance, a one-way clutch 32a runs idle and the first stator 18 acts as a normal turbine rotating in the same direction as the turbine 14. Under the third-speed mode, the torque converter 10 therefore functions as a two-phase torque converter which developes a comparatively good efficiency in the high speed ratio zone so that an efficiency characteristic $\eta 3$ and a torque ratio characteristic T3 become obtainable. Further, a practical reduction ratio of the speed changer becomes 1.

When the speed ratio further rises, the lock-up clutch 28 is switched to ON by the automatic control and the power from the engine is transmitted directly from the turbine shaft 26 to the speed changer 12.

While, under the backward drive mode wherein only the clutch R is switched to ON, only the second ring gear 42b is fixed to the housing 22 and the other planetary gear trains rotate integrally, so that the power from the torque converter is transmitted through both the turbine shaft 26 and the first stator shaft 30 and the planetary carrier rotates in the reverse direction. In the backward drive mode, the efficiency characteristic of the torque converter 10 becomes $\eta R$ and its torque ratio characteristic becomes TR.

The above-mentioned reduction ratios and those of the first stator in each speed change mode are tabulated in Table 1. Further, ◯ marks in the Table indicate switching on of the brakes and clutch.

TABLE 1

| Speed mode | F1 | F2 | F3 | R | Reduction ratio | Reduction ratio of 1st stator |
|---|---|---|---|---|---|---|
| Forward | | | | | | |
| 1st | ◯ | | | | $\dfrac{Za_1 - Zr_1}{Za_1} > 2$ | $-\dfrac{Zr_1 - Za_2}{Za_2}$ |
| 2nd | | ◯ | | | $2 > \dfrac{Za_1 + Za_2}{Za_1} > 1$ | 0 |
| 3rd | | | ◯ | | 1 | 1 |
| Backward | | | | ◯ | $-\dfrac{Zr_2 - Za_1}{Za_1}$ | $-2 > -\dfrac{Za_2 + Zr_2}{Za_2}$ |

A tractive force characteristic of the abovementioned automatic transmission becomes as FIG. 1b. Namely, it alters from a first-speed mode tractive force characteristic shown by D1 through a secondspeed mode tractive force characteristic D2 and a third-speed mode tractive force characteristic D3 to a third-speed lock-up mode tractive force characteristics D3L, in sequence. They develop characteristics approximately similar to tractive force characteristics M1~M6 (suffix indicating a number of speed changing stage), which show a case of conventional manual six-stage speed changer, by means of the speed changing stage of three smaller than a conventional four-stage automatic transmission. Incidentally, D2L in FIG. 1b shows a tractive force characteristic at the time of second-speed lock-up.

The first embodiment for use in a truck has the following features ①, ②, and ③.

① In the first-speed and backward drive modes; since the reversing force of the first stator 18 is outputted through the gears, a large torque can be obtained at a low-speed running i.e. in a low-speed ratio zone of the torque converter 10, and the torque is changed in a stepless manner in the intermediate speed ratio zone to provide a three-phase torque converter characteristic. Therefore, a tractive force characteristic corresponding to a low-speed running is developed to be able to cover first-, second- and third-speed regions of the manual transmission.

For both the first-speed and backward drive modes of the speed changer 12, the speed reduction is effected by fixing respectively the ring gears 42a and 42b of the planetary gear train to provide a practical reduction ratio of about 3.

② In the second-speed mode; the reduction ratio is changed by fixing the second sun gear 36b interconnected to the first stator 18 of the planetary gear train, a large torque can be obtained in the intermediate and high speed ratio zones by fixing the first stator 18, a tractive force characteristic corresponding to an intermediate-speed running is developed by providing the three-phase torque converter characteristic; thereby third-, fourth- and fifth-speed regions can be covered.

The speed changer 12 provides a reduction ratio of about 1.5 for the second-speed.

③ In the third-speed mode; the tractive force is maintained in the high-speed ratio zone by connecting the first stator 18 with the turbine 14 to be an integral turbine, a tractive force characteristic corresponding to a high-speed running is developed by providing the two-phase torque converter characteristic; thereby fifth- and sixth-speed regions can be covered. The speed changer provides a reduction ratio of 1 for the third-speed.

Accordingly, the reduction ratio is changed in the first-, second- and third-speed modes and at the same time the torque converter characteristic itself is changed to a form corresponding to respective speed zone so that the number of speed changing stage can be lessened. Further, the gear train necessary for changing speed is formed into a double planetary gear by engaging the planetary gears 38a and 38b of the two pairs of planetary gear trains each other with the carrier 40 shared in common. The sun gears 36a and 36b and the ring gears 42a and 42b are made mesh with respective planetary gears 38a and 38 b, the input shaft is connected to respective sun gears 36a and 36b, the brakes F1, F2 and R are equipped to respective ring gears and the sun gears connected to the first stator 18, and the clutch F3 engaging the first stator 18 with the turbine 14 is provided. Thus, the speed change of four stages: the first-, second-, third-speed and backward drive stages can be provided with a simplified and compact structure which can be manufactured in a low cost. Further, the tractive force and fuel consumption can be improved by equipping the lock-up clutch 28.

EFFECT OF THE INVENTION

According to the present invention as described above, in the automatic transmission combining the four-element, two-stage type torque converter having the turbine, the pump, the first stator and the second stator with the speed changer having the planetary gear train composed of the first and second planetary gears sharing one planetary carrier in common and the clutch or brake for controlling the planetary gear train; the turbine of the torque converter is coupled to the turbine shaft which transmits the power from the turbine to the speed changer; the first stator is provided at the turbine side between the turbine and the pump, the first stator being coupled to the first stator shaft, which transmits the power from the first stator to the speed changer, through the one-way clutch which transmits the power only in the direction reverse to the rotation direction of said pump; the second stator is provided at the pump side between the turbine and the pump, the second stator being connected to the housing through the second stator shaft having the one-way clutch which transmits the power only in the direction reverse to the rotation direction of said pump; the clutch or brake for controlling the rotation speed of the first stator shaft is provided in the course of the first stator shaft; the first sun gear meshing with the first planetary gear of said speed changer is fixed to the end portion of the turbine shaft; the second sun gear meshing with the second planetary gear of said speed changer is fixed to the end portion of the first stator shaft; the brake is provided at the clutch cover side of said clutch; thereby the transmission efficiency of torque converter at each speed ratio zone is improved by making these brake and clutch selectively operate depending on the speed ratio. Therefore, the following advantages become obtainable.

Namely, under the first-speed and backward drive modes which are frequently used in the low-speed ratio zone, the first stator 18 is made act as the reversing turbine to develop the characteristic $\eta 1$ (FIG. 1a) showing a high efficiency in the low-speed ratio zone. Under the second-speed mode which is frequently used in the intermediate speed ratio zone, the reaction force generated by fixing the first stator 18 is utilized to develop the characteristic $\eta 2$ (FIG. 1a) showing a high efficiency in the intermediate-speed ratio zone. Under the third-speed mode, the first stator 18 is made act as the normal turbine to develop the characteristic $\eta 3$ showing a high efficiency in the high-speed ratio zone. Thus, the efficiency of the torque converter 10 can be improved over the entire speed ratio zone.

Therefore, even if the number of speed changing stage of automatic transmission is reduced from conventional four to three, the tractive force characteristics D1~D3L, which are approximately similar to those of the six-speed manual speed changer as shown in FIG. 1b, can be obtained.

Moreover, the mechanism of the speed changer 12 becomes simple, the automatic controls of brake and clutch are simplified and its hydraulic circuit becomes plain.

Another Embodiment (1) Second embodiment

An automatic transmission for passenger car according to the present invention will be described hereunder with rederence to FIG. 3 and FIG. 4.

Figure 3:
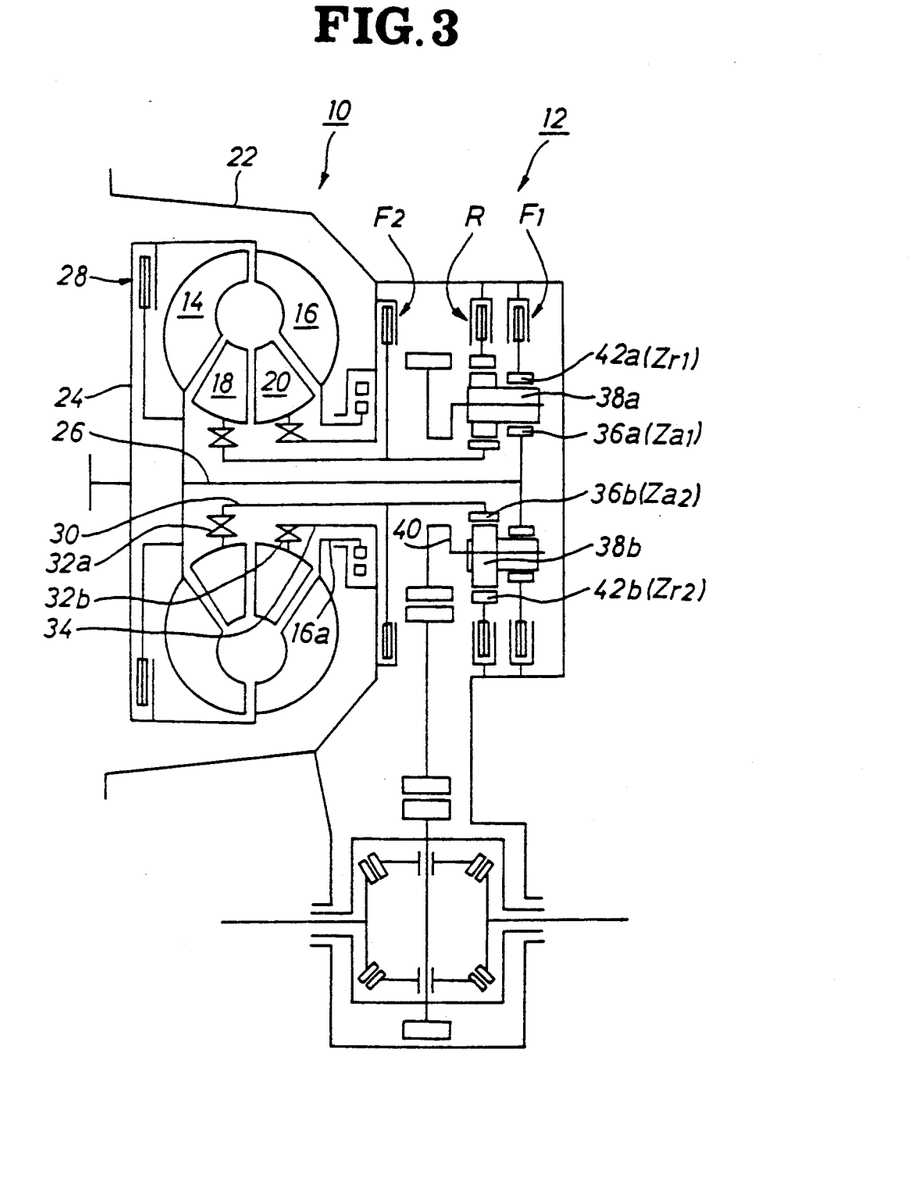
FIG. 3 is a schematic structural view showing an automatic transmission for use in an FF passenger car.
Figure 4:
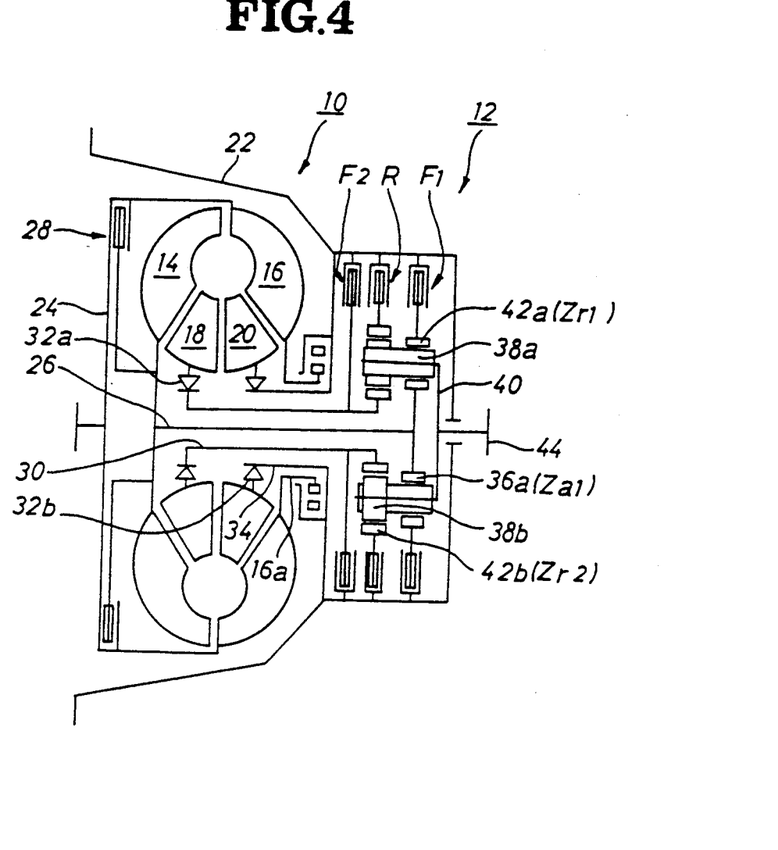
FIG. 4 is a schematic structural view showing an automatic transmission for use in an FR passenger car.

FIG. 3 shows an automatic transmission for FF car and FIG. 4 shows that for FR car.

In a conventional automatic speed changer for passenger car, speed changes of forward three-speed and backward one-speed have generally been effected by controlling two pairs of conpound planetary gear trains, and a three-element, one-stage type torque converter used in it has had a constant characteristic over the entire speed changing stage zone.

While in the present invention, as described above, in the first-speed and backward drive zones the reversing force of the first stator 18 is utilized by adding one stator thereto. And in the second-speed zone, the reaction of the first stator 18 is utilized by fixing it, the tractive force characteristic of conventional automatic speed changer can be sufficiently covered by providing the torque converter with different tractive force characteristics suitable for respective three-phase driving characteristics, and the speed changer can be controlled by using only the tree brakes, so that it becomes possible to fabricate the speed changer 12 into a small size and at a low cost.

Reduction ratios of the FF car for FIG. 3 are shown in Table 2

TABLE 2

| Speed mode | F1 | F2 | R | Reduction ratio | Reduction ratio of 1st stator |
|---|---|---|---|---|---|
| Forward | | | | | |
| 1st | ○ | | | $\dfrac{Za_1 + Zr_1}{Za_1} > 2$ | $-\dfrac{Zr_1 - Za_2}{Za_2}$ |
| 2nd | | ○ | | $2 > \dfrac{Za_1 + Za_2}{Za_1}$ 1 | 0 |
| Backward | | | ○ | $-\dfrac{Zr_2 - Za_1}{Za_1}$ | $-2 > -\dfrac{Za_2 + Zr_2}{Za_2}$ |

Figure 4A:
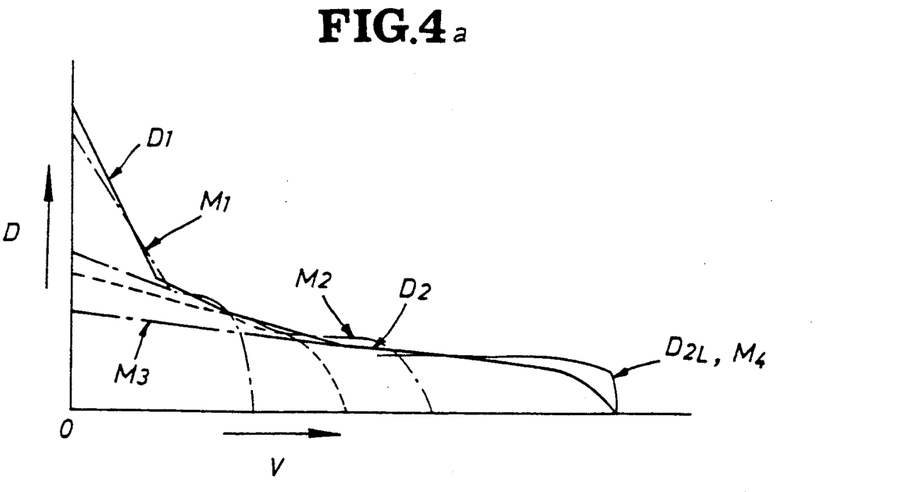
FIG. 4a is a graph showing a tractive force characteristic for FIG. 4.

Further, a tractive force characteristic of FR car for FIG. 4 is shown in FIG. 4a. In FIG. 4a showing a behavior of tractive force D in relation to vehicle speed V, D1~D2L presents tractive force characteristics in each speed changing stage of the automatic transmission shown by FIG. 4, and M1~M4 presents a case of conventional manual speed changer.

(2) Third embodiment

Figure 5:
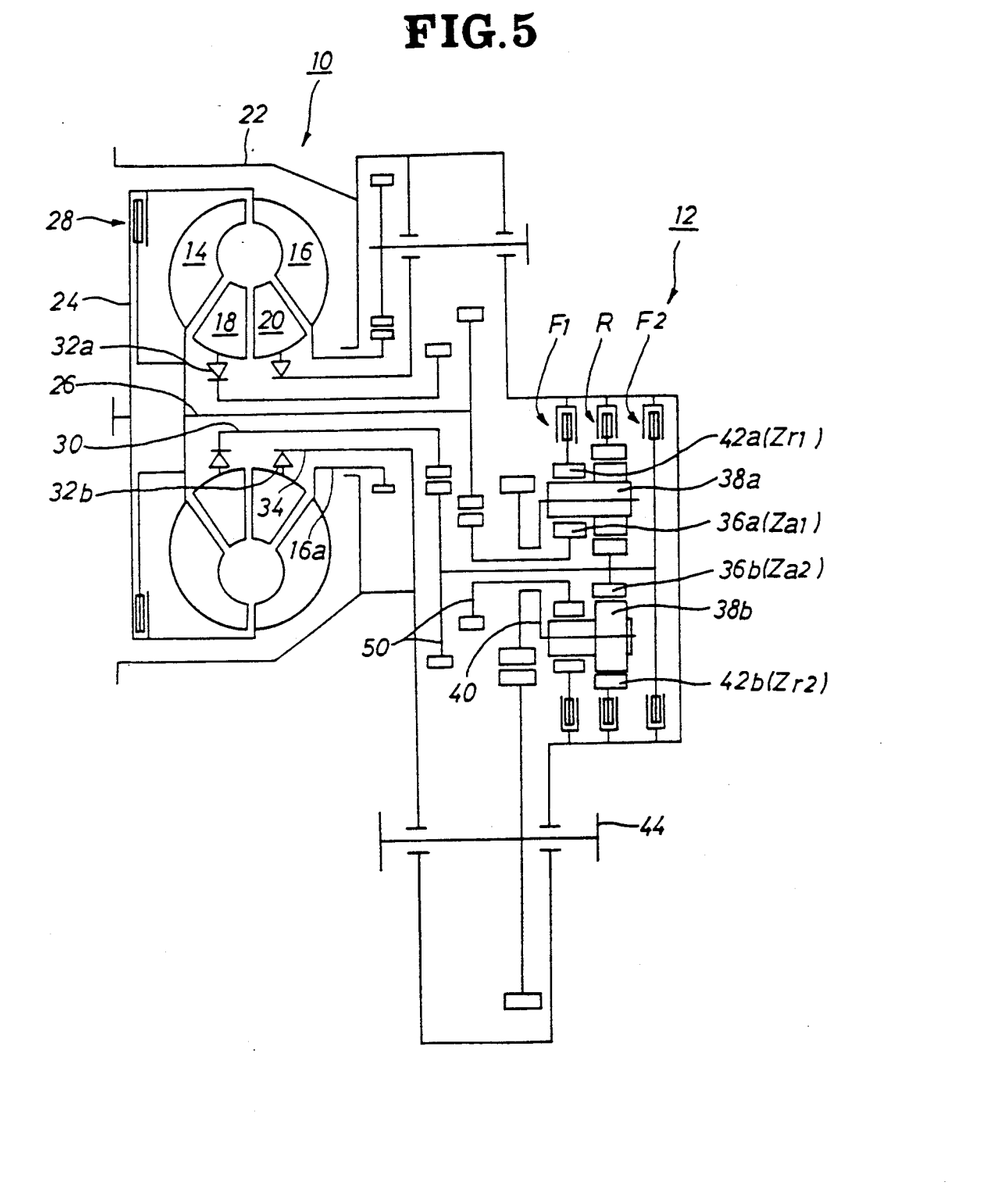
FIG. 5 is a schematic structural view showing a power shift transmission for use in a construction machine.

A power shift transmission for use in construction machine such as, for example, a power shovel according to the present invention will be described hereunder with reference to FIG. 5.

Generally in a power shift transmission for use in construction machine, since a power of engine is used also as a power source for work other than for driving a vehicle, a PTO (Power Take Off) unit is required and it becomes necessary to offset its output shaft due to a large tire diameter.

In the present invention, the outputs of the turbine and the first stator 18 stator are inputted in said conpound double planetary gear train through the counter gears 50 and controlled as described above to provide different characteristics for the first-speed and second-speed zones. Further, braking torques for respective brakes can be minimized because the turbine rotation can be inputted in the planetary gear train by being increased its speed, and its output rotation can be outputted at a speed lower than its input rotation because the output rotation can be taken out from the planetary carrier 40. For this reason, this transmission is applicable to the power shift transmission for use in construction machine which requires a large reduction ratio.

(3) Further, the present invention is not limitted to the above-mentioned embodiments. But, if only the clutch F3 is removed from the forward three-speed and backward one-speed automatic transmission in case of the transmission for truck of FIG. 1, it becomes possible to provide a further simplified forward two-speed and backward one-speed aulomatic transmission.

What is claimed is

1. An automatic transmission having a housing (22) and comprising, in combination in said housing, a four-element two stage type torque converter (10) having an input member (24), a turbine (14), a pump (16), first and second stators (18, 20) between said turbine and said pump, and a four-gear speed changer (12) having a speed changer output shaft (44), first and second planetary gears (38*a*, 38*b*) connected to said speed changer output shaft (44) by means of a common gear carrier (40), first and second ring gears (42*a*, 42*b*), first and second sun gears (36*a*, 36*b*) engaging with corresponding first and second planetary gears (38*a*, 38*b*), respectively, and three forward speeds and a reverse speed change means (F1, F2, F3, R) for controlling said planetary gears, sun gears and ring gears (38*a*, 38*b*, 36*a*, 36*b*, 42*a*, 42*b*) in trains at a selected speed CHARACTERIZED IN THAT said pump (16) of said torque converter (10) is connected to a charging pump through a pump shaft (16*a*), said turbine (14) is connected to said first sun gear (36*a*) through a turbine output shaft (26) of said torque converter (10), said first stator (18) is connected to said second sun gear (36*b*) through a first one-way clutch (32*a*) and a first stator shaft (30) for transmitting only input rotational power of said input member (24) to said speed changer output shaft (44), and said second stator (20) is connected to a second stator shaft (34) and a wall of said housing (22) through a second one-way clutch (32*b*) which is rotatable only in forward direction, said first stator shaft (30) is connected to said housing wall (22) through a second forward speed change means (F2) and coupled with said turbine output shaft (26) through a third speed change means (F3), and said first and second ring gears (42*a*, 42*b*) are coupled to said wall (22) through a first speed change means (F1) and a reverse speed change means (R), respectively, thereby during third forward speed operation said turbine (14) and first stator (18) are driven in one unit by means of said third speed change means (F3) to transmit rotational input power through said torque converter (10) and said four-gear changer (12) to said speed changer output shaft (44).

2. An automatic transmission as claimed in claim 1, wherein said transmission further includes a lock-up clutch means (28) for coupling said input shaft (24) to said turbine output shaft (26) of said torque converter (10).

* * * * *